(12) United States Patent
Aroca

(10) Patent No.: US 12,003,278 B1
(45) Date of Patent: Jun. 4, 2024

(54) DIFFERENTIALLY-BALANCED PHOTODETECTOR CONFIGURATION FOR COHERENT RECEIVER

(71) Applicant: Acacia Communications, Inc., Maynard, MA (US)

(72) Inventor: Ricardo Aroca, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 17/554,194

(22) Filed: Dec. 17, 2021

Related U.S. Application Data

(60) Provisional application No. 63/131,623, filed on Dec. 29, 2020.

(51) Int. Cl.
*H04B 10/61* (2013.01)
*H04B 10/40* (2013.01)

(52) U.S. Cl.
CPC ........... *H04B 10/616* (2013.01); *H04B 10/40* (2013.01)

(58) Field of Classification Search
CPC .............................. H04B 10/40; H04B 10/616
USPC ........................................................... 398/135
See application file for complete search history.

(56) References Cited

U.S. PATENT DOCUMENTS

| | | | |
|---|---|---|---|
| 9,369,213 B1* | 6/2016 | Kakande | H04L 25/03331 |
| 11,101,895 B2* | 8/2021 | Zhang | H04J 14/0221 |
| 2016/0119064 A1* | 4/2016 | Yamaji | H04B 10/40 385/33 |
| 2017/0134097 A1* | 5/2017 | Morie | H04B 10/61 |
| 2018/0152242 A1* | 5/2018 | Kurisu | H04B 10/0795 |
| 2018/0302169 A1* | 10/2018 | Suzuki | H04B 10/61 |
| 2020/0382217 A1* | 12/2020 | Younce | H04B 10/614 |
| 2021/0239921 A1* | 8/2021 | Valdmanis | G02B 6/43 |

* cited by examiner

*Primary Examiner* — Dalzid E Singh
(74) *Attorney, Agent, or Firm* — K&L GATES LLP

(57) ABSTRACT

A differentially-balanced photodetector arrangement is described for use in a coherent optical receiver. The differentially-balanced photodetector arrangement may include balanced differential photodetector pairs. The balanced differential photodetector pairs may generate a differential electrical signal. The differential electrical signal may include the data received by the coherent optical receiver.

16 Claims, 5 Drawing Sheets

DIFFERENTIALLY-BALANCED PHOTODETECTOR CONFIGURATION FOR COHERENT RECEIVER

CROSS REFERENCE OF RELATED APPLICATIONS

This application claims priority to and the benefit of U.S. Provisional Application No. 63/131,623 filed on Dec. 29, 2020 the entire disclosure of which is incorporated by reference herein.

FIELD

Aspects of the present application relate to a differentially-balanced photodetector configuration for use in a coherent optical receiver.

BACKGROUND

Coherent optical receivers receive an optical data signal and process that signal using a local oscillator ("LO") signal to extract the data. The processing involves detecting the optical signal and converting it to an electrical signal using a photodetector. Some coherent optical receivers are implemented as photonic integrated circuits ("PICs").

SUMMARY

Aspects of the present application relate to an apparatus and methods for providing a differential balanced coherent optical receiver. Features as described herein may be used together, separately, or in any suitable combination.

According to an aspect of the present application, a coherent optical transceiver is provided, comprising: at least one optical input port; and at least one coherent optical receiver connected to the optical input port. At least one of the coherent optical receivers comprises: an optical circuit configured to receive an optical input signal and a local oscillator (LO) signal and output a differential electrical signal that is insensitive to a power level of the local oscillator (LO) signal; and an amplifier having first and second input terminals, and configured to receive at the first and second input terminals the differential electrical signal.

In some embodiments, the optical circuit comprises a first output terminal; a second output terminal; first and second photodetectors coupled to the first output terminal; and third and fourth photodetectors coupled to the second output terminal. In some embodiments, the first output terminal of the optical circuit is coupled to the first input terminal of the amplifier; and the second output terminal of the optical circuit is coupled to the second input terminal of the amplifier.

In some embodiments, the optical circuit further comprises an optical coupler with first and second output terminals; a first signal splitter having an output terminal; and a second signal splitter having an output terminal; wherein the first output terminal of the optical coupler is coupled to the first signal splitter; the second output terminal of the optical coupler is coupled to the second signal splitter; the output terminal of the first signal splitter is optically coupled to the first and fourth photodetectors; and the output terminal of the second signal splitter is optically coupled to the second and third photodetectors.

In some embodiments, light output from the second output terminal of the optical coupler differs in phase relative to light output from the first output of the optical coupler by approximately 180 degrees. In some embodiments, the coherent optical transceiver further comprises a mixer configured to mix the optical input signal and local oscillator signal, the mixer having an output terminal coupled to an input terminal of the optical circuit. In some embodiments, the transceiver is implemented in a photonic integrated circuit.

According to an aspect of the present application, a coherent optical receiver is provided, comprising: an optical circuit configured to receive an optical input signal and a local oscillator (LO) signal and output a differential electrical signal that is insensitive to a power of the LO signal; and an amplifier having first and second input terminals, and configured to receive at the first and second input terminals the differential electrical signal.

In some embodiments, the optical circuit and the amplifier form part of a first channel, and wherein the coherent optical receiver comprises between four and 16 channels, at least two of which each has an optical circuit configured to receive an optical input signal and a local oscillator signal and output a differential electrical signal that is insensitive to the power level of the local oscillator signal and an amplifier having first and second input terminals, and configured to receive at the first and second input terminals the differential electrical signal. In some embodiments, the amplifier is a transimpedance amplifier. In some embodiments, the optical circuit comprises a first balanced photodetector pair configured to receive a differential optical signal and output a first electrical component of the differential electrical signal on a first electrical output node of the optical circuit; and a second balanced photodetector pair configured to receive the differential optical signal and output a second electrical component of the differential electrical signal on a second electrical output node of the optical circuit.

In some embodiments, the first electrical output node of the optical circuit is coupled to the first input terminal of the amplifier, and wherein the second electrical output node of the optical circuit is coupled to the second input terminal of the amplifier. In some embodiments, the optical circuit further comprises an optical coupler comprising first and second output terminals, wherein light output from the second output terminal of the optical coupler differs in phase relative to light output from the first output terminal of the optical coupler by about 180 degrees; a first signal splitter coupled to the first output terminal of the optical coupler; and a second signal splitter coupled to the second output terminal of the optical coupler; wherein light output by the first signal splitter is optically coupled to a first photodetector in the first balanced photodetector pair and to a second photodetector in the second balanced photodetector pair; and wherein light output by the second signal splitter is optically coupled to a second photodetector in the first balanced photodetector pair and to a first photodetector in the second balanced photodetector pair.

In some embodiments, the first photodetector of the first balanced photodetector pair is coupled to a power supply and to the first electrical output node of the optical circuit; the second photodetector of the first balanced photodetector pair is coupled to the first electrical output node of the optical circuit and to electrical ground; the first photodetector of the second balanced photodetector pair is coupled to a power supply and to the second electrical output node of the optical circuit; and the second photodetector of the second balanced photodetector pair is coupled to the second electrical output node of the optical circuit and to ground.

According to an aspect of the present application, a method of processing an optical signal in a coherent receiver is provided, comprising: receiving an optical data signal; mixing the optical data signal with a local oscillator signal to generate a multi-phase optical signal; optically processing the multi-phase optical signal to generate a differential electrical signal insensitive to power of the local oscillator signal; and amplifying the differential electrical signal using a differential amplifier.

In some embodiments, mixing the optical data signal with a local oscillator signal to generate a multi-phase optical signal further comprises generating first and second optical components of the multi-phase optical signal, wherein light in the second optical component differs in phase relative to the light in the first optical component by about 180 degrees. In some embodiments, optically processing the multi-phase optical signal further comprises splitting the first and second optical components to create two copies of the first optical component and two copies of the second optical component. In some embodiments, optically processing the multi-phase optical signal further comprises optically coupling one copy of each of the first and second optical components to each of a first and second balanced photodetector pair. In some embodiments, the differential amplifier has first and second input terminals and wherein amplifying the differential electrical signal using the differential amplifier further comprises coupling the first and second balanced photodetector pairs, respectively, to the first and second input terminals of the differential amplifier.

In some embodiments, each of the first and second balanced photodetector pairs is configured with a first photodetector coupled to a power supply and an output node, and a second photodetector coupled to the output node and ground, and wherein optically coupling one copy of each of the first and second optical components to each of a first and second balanced photodetector pair further comprises: optically coupling a first copy of the first optical component to the first photodetector of the first balanced photodetector pair; optically coupling a second copy of the first optical component to the second photodetector of the second balanced photodetector pair; optically coupling a first copy of the second optical component to the second photodetector of the first balanced photodetector pair; optically coupling a second copy of the second optical component to the first photodetector of the second balanced photodetector pair.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
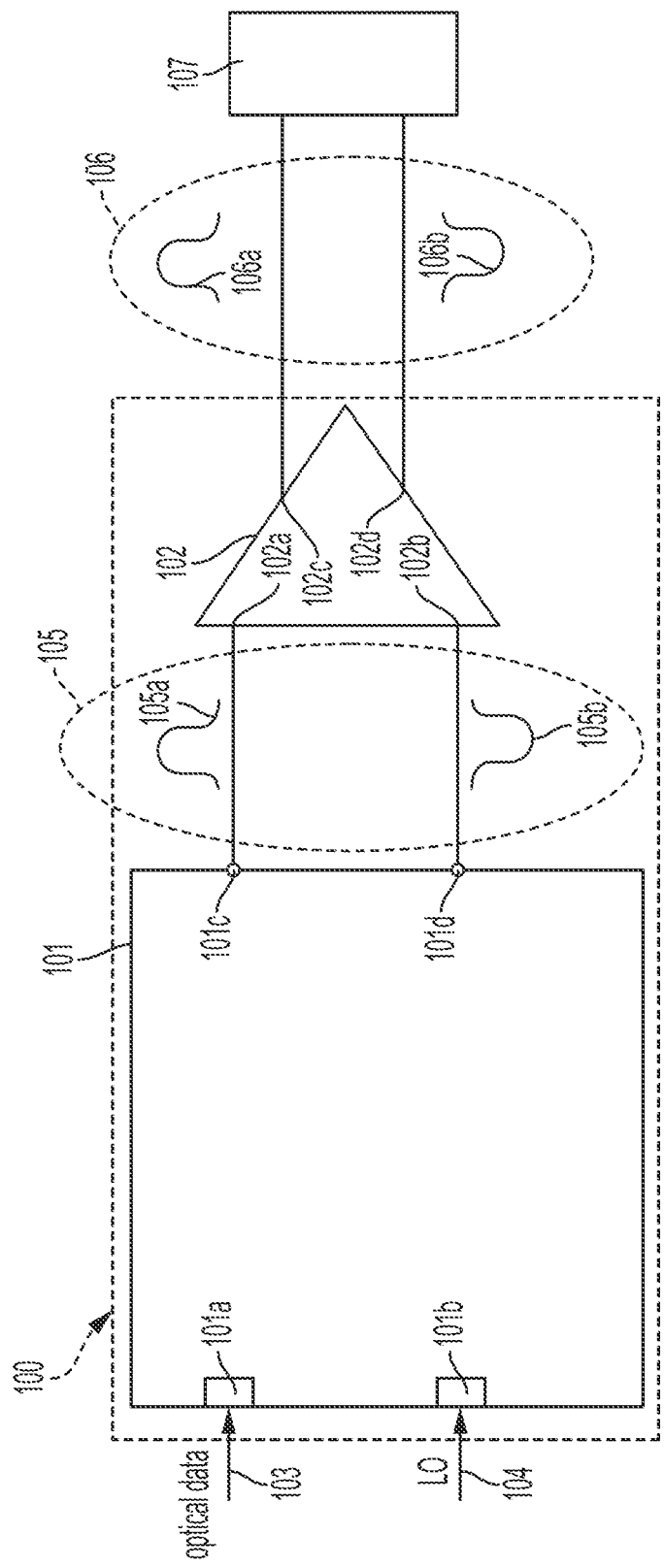
FIG. 1 illustrates a coherent optical receiver according to a non-limiting embodiment of the present application.

Aspects of the present application relate to a differentially-balanced photodetector configuration for use in a coherent optical receiver. In some embodiments, differentially-balanced photodetectors (PDs) form part of a low-noise coherent optical receiver. The low noise coherent optical receiver comprises an optical circuit configured to receive an optical data signal and produce a differential electrical signal. The optical circuit may mix the received optical data signal with a local oscillator (LO) signal. The resulting optical signal may be split into a differential optical signal having two optical components out-of-phase with each other by approximately 180 degrees. The differential optical signal may be provided to differentially-balanced photodetectors. The differentially-balanced photodetectors may include a first balanced photodetector pair and a second balanced photodetector pair. The first balanced photodetector pair may produce a first component of the differential electrical signal. The second balanced photodetector pair may produce a second component of the differential electrical signal. The first and second components of the differential electrical signal may be out-of-phase with each other by approximately 180 degrees. The coherent optical receiver may include electrical processing circuitry for suitably processing the differential electrical signal. The electrical processing circuitry may include a differential amplifier having a first input terminal coupled to receive the first component of the differential electrical signal. The differential amplifier may have a second input terminal coupled to receive the second component of the differential electrical signal. The differential amplifier may produce an amplified differential electrical signal. Optionally, the amplified differential electrical signal may be processed further by suitable electrical processing circuitry.

The differential electrical signal produced by the optical circuit of the coherent optical receiver may exhibit beneficial characteristics. In some embodiments, the differential electrical signal is insensitive to the power level of the LO signal. In some embodiments, the differential electrical signal lacks a direct current (DC) component. In some embodiments, the optical circuit prevents the LO from imparting a DC component to the differential electrical signal by employing balanced photodetector pairs. In some embodiments, the differential electrical signal produced from the optical data signal lacks a DC component, and the coherent optical receiver lacks a DC removal loop designed to remove any DC component from an output of the photodetectors.

According to an aspect of the present application, a coherent optical receiver may have multiple input channels, one or more of which may receive incoming optical data carried by a different optical signal, or by a different component of an optical signal. In some embodiments, each input channel may be configured to receive incoming optical data carried by a respective optical signal or a respective component of an optical signal. In some embodiments, in a coherent receiver comprising multiple input channels, at least one of the input channels contains a differential photodetector configuration as described above. For example, at least one of the input channels may comprise an optical circuit having differentially-balanced photodetectors.

FIG. 1 is a block diagram of a coherent optical receiver 100 according to an aspect of the present application. The coherent optical receiver is configured to receive an incoming optical data signal, mix it with an optical LO signal, and then generate an amplified differential electrical signal derived from the mixed data and LO signals. The generation of the differential electrical signal is accomplished in part by using an optical circuit having differentially-balanced PDs.

The coherent optical receiver 100 of FIG. 1 comprises an optical circuit 101. The optical circuit 101 is configured to receive an optical data signal and a LO signal and produce a differential electrical signal. Optical circuit 101 comprises two optical input ports. The two optical input ports include data input port 101a and LO input port 101b. The data input port 101a is configured to receive incoming optical data signal 103. The LO input port 101b is configured to receive LO signal 104. The optical circuit 101 further comprises two electrical output ports, 101c and 101d. Electrical output ports 101c and 101d provide electrical signals 105a and 105b, respectively. Electrical signals 105a and 105b represent the two differential components of differential electrical signal 105. Electrical output ports 101c and 101d are connected to the input terminals 102a and 102b, respectively, of differential amplifier 102. Differential amplifier 102 may be a trans-impedance amplifier (TIA). Differential amplifier 102 also has two electrical output terminals 102c and 102d. The electrical signals 106a and 106b that are output on electrical output terminals 102c and 102d, respectively, represent the two differential components of differential electrical signal 106. Differential electrical signal 106 is an amplified version of differential electrical signal 105. The amplified differential electrical signal 106 may then be fed into electrical circuitry 107 for further electrical processing. Electrical circuitry 107 may include suitable circuitry for performing any desired signal processing, including but not limited to filtering, amplifying, phase-shifting, converting from an analog signal to a digital signal, or decoding.

Figure 2:
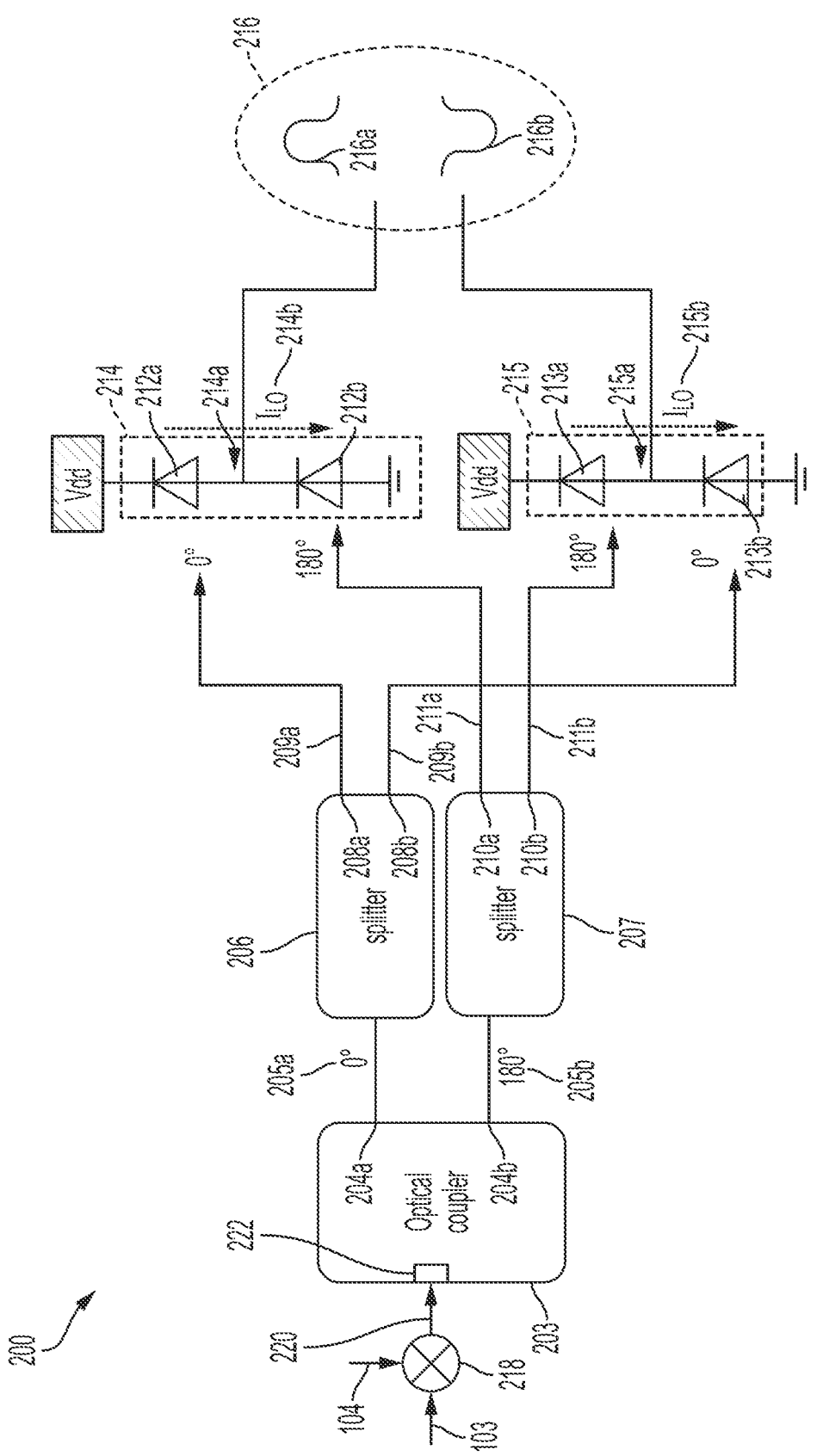
FIG. 2 illustrates a differentially-balanced photodetector arrangement, according to a non-limiting embodiment of the present application.

FIG. 2 illustrates an optical circuit according to aspects of the present application. The optical circuit 200 is a non-limiting example of an implementation of the optical circuit 101 shown in FIG. 1. In the optical circuit 200 shown in FIG. 2, the incoming optical data signal 103 and the LO signal 104 are input to a mixer 218. The mixer 218 outputs a mixed optical signal 220 to the optical coupler 203. The mixed optical signal may include multiple components of different phase, and thus may be considered a multi-phase optical signal. The optical coupler 203 includes an optical input terminal 222 configured to receive the mixed optical signal 220. The optical coupler 203 has two optical output terminals, 204a and 204b. Optical signals 205a and 205b are emitted from the optical output terminals 204a and 204b, respectively. The optical coupler 203 processes the mixed optical signal 220 such that the optical signals 205a and 205b differ in phase from each other by approximately 180 degrees. Each of the optical signals 205a and 205b is input to a respective optical splitter. For example, optical signal 205a is input into optical splitter 206. Optical signal 205b is input into optical splitter 207. Optical splitter 206 has two optical output terminals, 208a and 208b. Each of optical output terminals 208a and 208b outputs a copy of the optical signal 205a, as optical signals 209a and 209b, respectively. Optical splitter 207 has two optical output terminals, 210a and 210b. Each of optical output terminals 210a and 210b outputs a copy of the optical signal 205b, as optical signals 211a and 211b, respectively.

In further reference to FIG. 2, the optical circuit 200 includes four PDs 212a, 212b, 213a, and 213b. As indicated by the dashed lines in the figure, PDs 212a and 212b are connected to each other in series to form a balanced pair 214. PDs 213a and 213b are connected together in series to form balanced pair 215. Each of the balanced pairs 214 and 215 is configured between a power supply Vdd and electrical ground. While not shown, the power supply Vdd may assume any suitable value, for example between 2 Volts and 5 Volts. Returning to FIG. 2, PD 212a of balanced pair 214 has a cathode terminal connected to the power supply Vdd and an anode terminal connected to a cathode terminal of PD 212b. The node between PD 212a and PD 212b may serve as an output node 214a of the balanced pair 214. The output node 214a may also be an output node of the optical circuit 200. PD 212b has a cathode terminal connected to an anode terminal of PD 212a at output node 214a, and an anode terminal connected to electrical ground. PD 213a of balanced pair 215 has a cathode terminal connected to the power supply Vdd and an anode terminal connected to the cathode terminal of PD 213b at output node 215a. PD 213b has a cathode terminal connected to an anode terminal of PD 213a. The node between PD 213a and PD 213b may serve as an output node 215a of the balanced pair 215. The output node 215a may also be an output node of the optical circuit 200.

In further reference to FIG. 2, the circuit is optically configured such that each of the four optical signals 209a, 209b, 211a, and 211b is directed at a different one of the four PDs 212a, 212b, 213a, and 213b. That is, the output terminals of the splitters 206 and 207 are optically coupled to the PDs 212a, 212b, 213a, and 213b as shown. For example: (1) optical signal 209a may be provided to PD 212a; (2) optical signal 209b may be provided to PD 213b; (3) optical signal 211a may be provided to PD 212b; and (4) optical signal 211b may be provided to PD 213a. It should be appreciated that as shown in FIG. 2, each of the two balanced pairs 214 and 215 receives a differential optical signal. The differential optical signal provided to balanced pair 214 is inverted with respect to the differential optical signal provided to balanced pair 215. As a result of providing the differential optical signals to balanced pairs of PDs, any DC current resulting from the LO flows through each balanced pair 214 and 215 from the power supply to ground, without flowing to the output nodes 214a and 215a, respectively. These DC current components "ILO" are represented by element numbers 214b and 215b, respectively, and the arrows pointing to the bottom of the figure indicates the flow of that current from power to ground.

In further reference to FIG. 2, the balanced pairs 214 and 215 in combination produce a differential electrical signal 216. Output node 214a provides a first component 216a of the differential electrical signal. Output node 215a provides a second component 216b of the differential electrical signal. Components 216a and 216b are approximately 180 degrees out-of-phase with each other. The differential electrical signal 216 may then be amplified by connecting output nodes 214a and 215a to the input terminals of a differential amplifier. For example, referring to FIG. 1, a differential amplifier such as differential amplifier 102 may be used.

Figure 3:
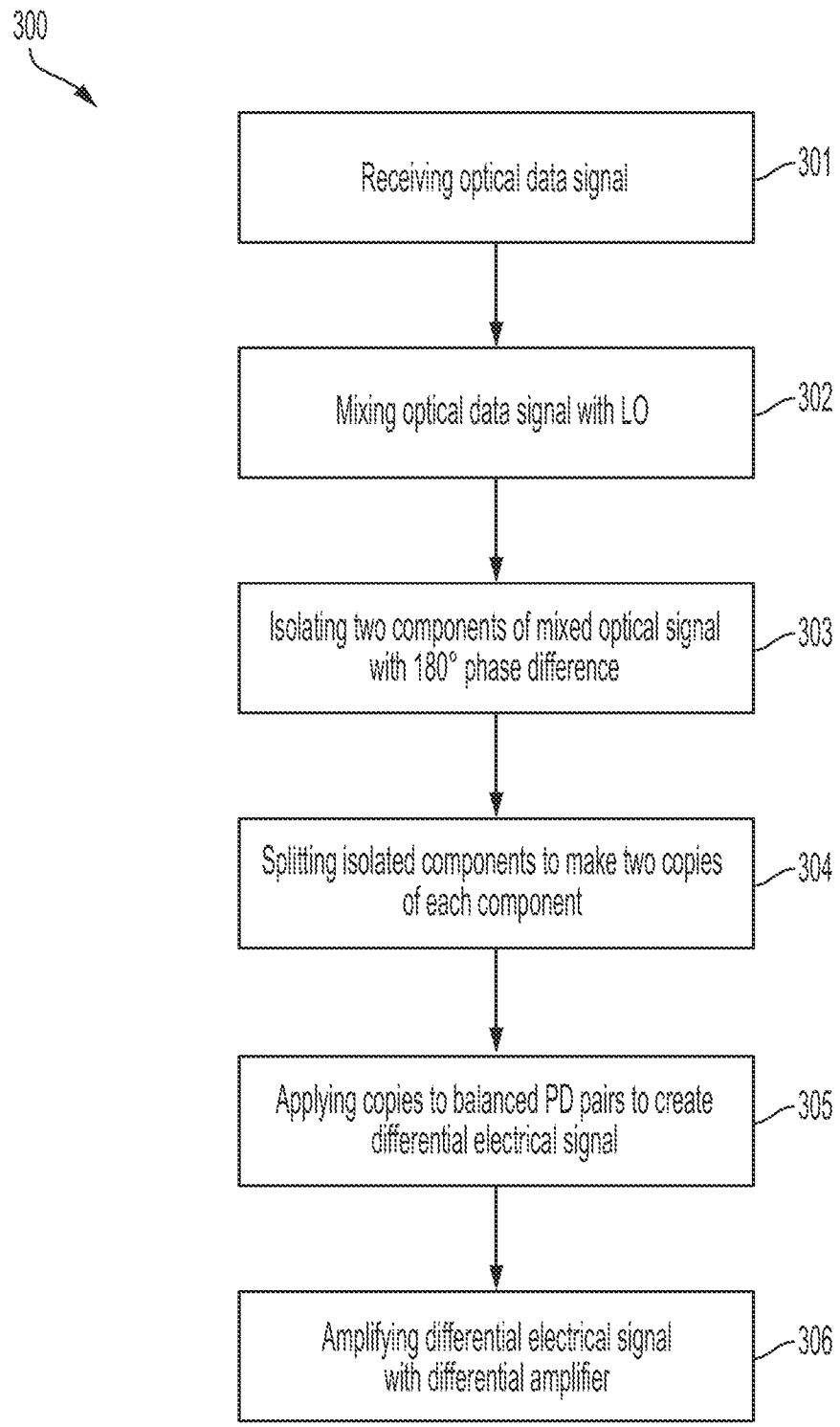
FIG. 3 is a flow chart illustrating a method of processing an optical signal in a coherent optical receiver using differentially-balanced photodetectors, according to a non-limiting embodiment of the present application.

FIG. 3 is a flow chart illustrating a method 300 of processing an optical signal in a coherent optical receiver, according to a non-limiting embodiment of the present application. In step 301, an optical data signal is received by the coherent optical receiver. In step 302, the optical data signal is mixed with a local oscillator (LO) signal to produce a mixed optical signal. The mixed optical signal may include multiple components of different phase, and thus may be considered a multi-phase optical signal. In step 303, multiple distinct components of the mixed optical signal may be isolated. For example, first and second components of the mixed optical signal may be isolated. In some embodiments, such as that illustrated in FIG. 3, the first and second components may differ in phase by approximately 180 degrees. In some embodiments, the first and second components may be referred to as the "0-degree" component and the "180-degree" component, respectively, without imposing any limitation on the absolute phase of those signals. An optical coupler may be used to perform step 303.

With further reference to FIG. 3, step 304 of the method 300 involves splitting the isolated signal components from step 303 to create multiple copies of the isolated signal components. For example, each of the isolated signal components may be split into two copies. For example, two copies of a 0-degree component and two copies of a 180-degree component may be produced.

In step 305, the four signal copies from step 304 are applied to two balanced PD pairs to create a differential electrical signal. In some embodiments, each balanced PD pair produces a different one of the two components of the differential electrical signal. In some embodiments, each balanced PD pair may comprise two PDs connected in series, with the cathode terminal of one PD connected to a power supply and the anode terminal of the other PD connected to ground. In some embodiments, the creation of the differential electrical signal may be accomplished by separately applying a differential optical signal to each balanced PD pair. The differential optical signal applied to one balanced PD pair may be inverted relative to the differential optical signal applied to the other balanced PD pair.

Finally, with further reference to FIG. 3, in step 306, the differential electrical signal created in step 305 is amplified. In some embodiments, this step may be accomplished by supplying the two components of the differential electrical signal to the input terminals of a differential amplifier.

Figure 4:
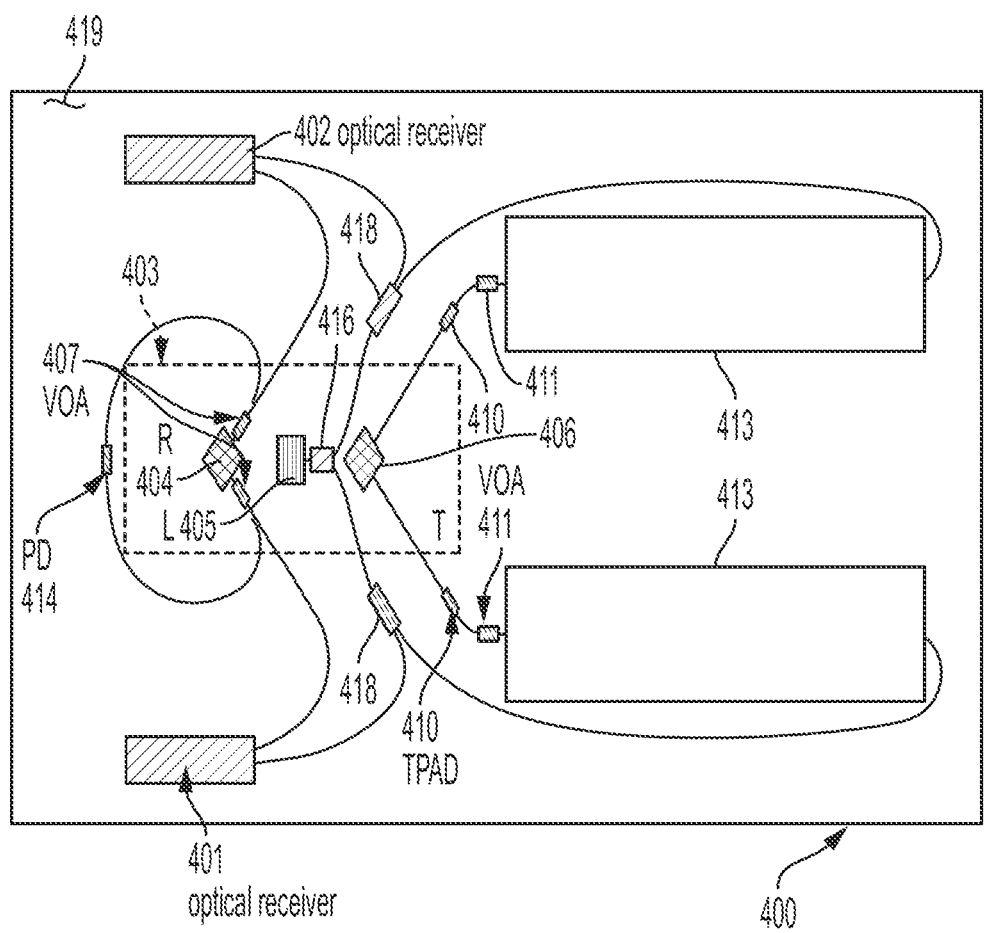
FIG. 4 illustrates a coherent optical receiver comprising differentially-balanced photodetectors, according to a non-limiting embodiment of the present application.

FIG. 4 is a schematic top-down view of a 3-port coherent optical transceiver 400 according to a non-limiting aspect of the present application. The transceiver 400 is implemented as a silicon photonic integrated circuitry (PIC). The silicon PIC may be formed on a silicon substrate 419.

The transceiver 400 comprises three optical ports: a receive port R 404, a local oscillator port L 405, and a transmit port T 406. One or more of these ports may be implemented as grating couplers. In some embodiments, one or more of these ports may be implemented as 2D grating couplers, as represented by the cross-hatch pattern in the figure for receive port R 404 and transmit port T 406. In some embodiments, the LO port L 405 may be a 1D grating coupler, as represented by the vertical fill pattern. Although not shown in FIG. 4, the three ports may be coupled to respective optical fibers. The optical fibers may form a fiber array in some embodiments. The receive port R 404, LO port L 405, and transmit port T 406 may collectively occupy a fiber assembly footprint outlined by box 403.

Returning to FIG. 4, the transceiver 400 includes various components for processing received optical signals. The receive port R 404 may comprise a grating coupler configured to divide an incoming optical data signal into different polarizations. For example, the receive port R 404 may divide the incoming optical signal into two different polarizations. One polarization may be sent to optical receiver 401. The other polarization may be sent to optical receiver 402. The two polarizations may be H and V polarizations, as a non-limiting example. In a non-limiting embodiment, each optical receiver 401 and 402 corresponds to optical receiver 100 of FIG. 1 with the optical circuit 200 of FIG. 2. Returning to FIG. 4, the optical receivers 401 and 402 are additionally coupled to the LO port L 405 to receive the LO signal.

The transceiver includes additional componentry for receive functionality. For example, variable optical attenuators (VOAs) 407 are provided. A photodetector 414 is included The photodetector 414 in combination with the VOAs 407 forms a tuning loop which may be used to regulate the power level of the received optical signal. The photodetector 414 may be used to detect the power level of the received optical signal, and the VOAs 407 may be used to adjust the power level.

Returning to FIG. 4, the transceiver 400 includes various components for processing optical signals to be transmitted from the transceiver 400 via the transmit port T 406. The LO signal from LO port L 405 is split by splitter 416 and then by splitters 418. These splitting functions provide the LO signal to both optical receiver 401 and 402, and to the two transmit channels include phase modulators 413. The two phase modulators 413 modulate a data signal onto the LO signal. The VOAs 411 receive the modulated data signal from the phase modulators 413 and attenuate the signals by a suitable amount. Two-photon absorption diodes (TPADs) 410 receive the signals from the VOAs and provide them to the transmit port T 406 for transmission out of the transceiver 400.

Figure 5:
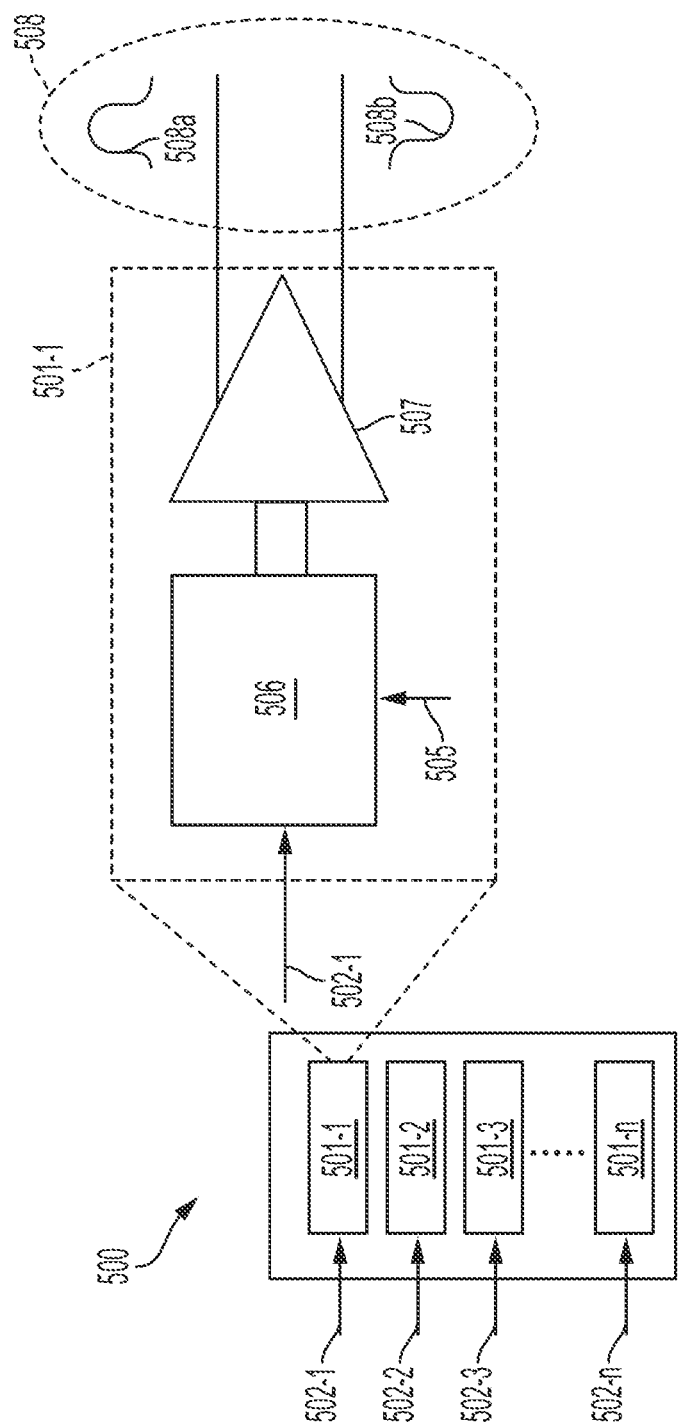
FIG. 5 illustrates a multi-channel coherent optical receiver, according to a non-limiting embodiment of the present application.

FIG. 5 illustrates a multi-channel coherent optical receiver 500, according to a non-limiting embodiment of the present application. The receiver 500 comprises multiple optical input channels 501-1, 501-2, 501-3 . . . 501-n configured to receive respective optical data signals, 502-1, 502-2, 502-3 . . . 502-n as an input. In some embodiments, a multi-channel coherent optical receiver 500 may include between four and 16 optical input channels. Other numbers of channels are possible, including any two or more optical input channels. Returning to FIG. 5, in some embodiments, one or more of the optical data signals 502-1 . . . 502-n may be components of an optical signal. For example, optical data signals 502-1 and 502-2 may be different polarization components of a same optical data signal.

Returning to FIG. 5, a detailed view of optical input channel 501-1 is shown. The optical input channel 501-1 comprises an optical circuit 506 and a differential amplifier 507. The optical circuit 506 may be of the types described previously herein. For example, the optical circuit 506 may be of the types described previously in connection with FIGS. 1 and 2. The optical circuitry 506 may receive the optical data signal 502-1 and a LO signal 505. The differential amplifier 507 may be of the types described previously herein in connection with FIGS. 1 and 2. The differential amplifier 507 may output a differential electrical signal 508 comprising differential components 508a and 508b.

It should be appreciated that one or more of the other optical input channels 501-2 . . . 501-n may have the same construction shown for optical input channel 501-1. In some embodiments of a multi-channel coherent optical receiver including more than two channels, at least two such channels may have the same construction shown for optical input channel 501-1.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A coherent optical transceiver comprising:
   at least one optical input port; and
   at least one coherent optical receiver connected to the optical input port,
   wherein at least one of the coherent optical receivers comprises:
   an optical circuit comprising
      a first output terminal;
      a second output terminal;
      an optical coupler with first and second output terminals;
      a first signal splitter having an output terminal; and
      a second signal splitter having an output terminal,
   the optical circuit configured to receive an optical input signal and a local oscillator (LO) signal and output a differential electrical signal that is insensitive to a power level of the local oscillator (LO) signal, the optical circuit comprising a first pair of balanced photodetectors and a second pair of balanced photodetectors,
      the first output terminal of the optical coupler is coupled to the first signal splitter;
      the second output terminal of the optical coupler is coupled to the second signal splitter;
      the output terminal of the first signal splitter is optically coupled to the first and fourth photodetectors; and
      the output terminal of the second signal splitter is optically coupled to the second and third photodetectors; and
   an amplifier having first and second input terminals, and configured to receive at the first and second input terminals the differential electrical signal.

2. The coherent optical transceiver of claim 1, wherein the optical circuit comprises:
   the first pair of balanced photodetectors comprising first and second photodetectors coupled to the first output terminal, wherein the first and second photodetectors are connected in series; and
   the second pair of balanced photodetectors comprising third and fourth photodetectors coupled to the second output terminal, wherein the third and fourth photodetectors are connected in series.

3. The coherent optical transceiver of claim 2, wherein:
   the first output terminal of the optical circuit is coupled to the first input terminal of the amplifier; and
   the second output terminal of the optical circuit is coupled to the second input terminal of the amplifier.

4. The coherent optical transceiver of claim 1, wherein light output from the second output terminal of the optical coupler differs in phase relative to light output from the first output of the optical coupler by approximately 180 degrees.

5. The coherent optical transceiver of claim 4, further comprising a mixer configured to mix the optical input signal and local oscillator signal, the mixer having an output terminal coupled to an input terminal of the optical circuit.

6. The coherent optical transceiver of claim 1, wherein the transceiver is implemented in a photonic integrated circuit.

7. A coherent optical receiver, comprising:
   an optical circuit comprising
   a first balanced photodetector pair configured to receive a differential optical signal and output a first electrical component of the differential electrical signal on a first electrical output node of the optical circuit;
   a second balanced photodetector pair configured to receive the differential optical signal and output a second electrical component of the differential electrical signal on a second electrical output node of the optical circuit;
   an optical coupler comprising first and second output terminals, wherein light output from the second output terminal of the optical coupler differs in phase relative to light output from the first output terminal of the optical coupler by about 180 degrees;
   a first signal splitter coupled to the first output terminal of the optical coupler; and
   a second signal splitter coupled to the second output terminal of the optical coupler;
   wherein light output by the first signal splitter is optically coupled to a first photodetector in the first balanced photodetector pair and to a second photodetector in the second balanced photodetector pair; and
   wherein light output by the second signal splitter is optically coupled to a second photodetector in the first balanced photodetector pair and to a first photodetector in the second balanced photodetector pair, the optical circuit configured to receive an optical input signal and a local oscillator (LO) signal and output a differential electrical signal that is insensitive to a power of the LO signal; and
   an amplifier having first and second input terminals, and configured to receive at the first and second input terminals the differential electrical signal.

8. The coherent optical receiver of claim 7, wherein the optical circuit and the amplifier form part of a first channel, and wherein the coherent optical receiver comprises between four and 16 channels, at least two of which each has an optical circuit configured to receive an optical input signal and a local oscillator signal and output a differential electrical signal that is insensitive to the power level of the local oscillator signal and an amplifier having first and second input terminals, and configured to receive at the first and second input terminals the differential electrical signal.

9. The coherent optical receiver of claim 7, wherein the amplifier is a transimpedance amplifier.

10. The coherent optical receiver of claim 7, wherein the first electrical output node of the optical circuit is coupled to the first input terminal of the amplifier, and wherein the second electrical output node of the optical circuit is coupled to the second input terminal of the amplifier.

11. The coherent optical receiver of claim 7, wherein: the first photodetector of the first balanced photodetector pair is coupled to a power supply and to the first electrical output node of the optical circuit; the second photodetector of the first balanced photodetector pair is coupled to the first electrical output node of the optical circuit and to electrical ground; the first photodetector of the second balanced photodetector pair is coupled to a power supply and to the second electrical output node of the optical circuit; and the second photodetector of the second balanced photodetector pair is coupled to the second electrical output node of the optical circuit and to ground.

12. A method of processing an optical signal in a coherent receiver, comprising:
   receiving an optical data signal;
   mixing the optical data signal with a local oscillator signal to generate a multi-phase optical signal;
   optically processing the multi-phase optical signal to generate a differential electrical signal insensitive to power of the local oscillator signal, wherein optically processing the multi-phase optical signal further comprises;

optically coupling one copy of each of the first and second optical components to each of a first and second balanced photodetector pair;

optically coupling a first copy of the first optical component to the first photodetector of the first balanced photodetector pair;

optically coupling a second copy of the first optical component to the second photodetector of the second balanced photodetector pair;

optically coupling a first copy of the second optical component to the second photodetector of the first balanced photodetector pair; and amplifying the differential electrical signal using a differential amplifier.

13. The method of claim 12, wherein mixing the optical data signal with a local oscillator signal to generate a multi-phase optical signal further comprises generating first and second optical components of the multi-phase optical signal, wherein light in the second optical component differs in phase relative to the light in the first optical component by about 180 degrees.

14. The method of claim 13, wherein optically processing the multi-phase optical signal further comprises splitting the first and second optical components to create two copies of the first optical component and two copies of the second optical component.

15. The method of claim 14, wherein the differential amplifier has first and second input terminals and wherein amplifying the differential electrical signal using the differential amplifier further comprises coupling the first and second balanced photodetector pairs, respectively, to the first and second input terminals of the differential amplifier.

16. The method of claim 15, wherein each of the first and second balanced photodetector pairs is configured with a first photodetector coupled to a power supply and an output node, and a second photodetector coupled to the output node and ground.

* * * * *